United States Patent [19]

Jakob et al.

[11] 4,455,133
[45] Jun. 19, 1984

[54] EXTRUDER COATING DIE

[75] Inventors: Willi Jakob; Lothar Hornivius, both of Ehringshausen, Fed. Rep. of Germany

[73] Assignee: Küster + Co. GmbH, Ehringshausen, Fed. Rep. of Germany

[21] Appl. No.: 383,987

[22] Filed: Jun. 1, 1982

[30] Foreign Application Priority Data

Jun. 9, 1981 [DE] Fed. Rep. of Germany ....... 3122744

[51] Int. Cl.$^3$ .............................. B29F 3/04; B29F 3/10
[52] U.S. Cl. .................................... 425/113; 264/167; 264/173; 264/174; 264/177 R; 425/132; 425/381; 425/465; 425/466
[58] Field of Search ............... 425/113, 381, 466, 465, 425/132; 264/173, 174, 167, 177 R

[56] References Cited

U.S. PATENT DOCUMENTS

| 3,422,648 | 1/1969 | Lemelson | 425/113 |
| 3,557,403 | 1/1971 | Lemelson | 425/113 |
| 3,834,009 | 9/1974 | Iida et al. | 264/173 |
| 3,932,090 | 1/1976 | Bromlik | 425/381 |
| 4,204,496 | 5/1980 | Ikegami et al. | 425/113 |
| 4,281,978 | 8/1981 | Shigematsu | 264/167 |

FOREIGN PATENT DOCUMENTS

| 4311573 | 5/1965 | Japan | 264/167 |
| 48-5094 | 2/1973 | Japan | 264/173 |
| 52-54758 | 5/1977 | Japan | 264/174 |
| 55-32609 | 3/1980 | Japan | 264/173 |

Primary Examiner—Jeffery R. Thurlow
Attorney, Agent, or Firm—Wells & Wells

[57] ABSTRACT

An extruder coating die for depositing protective cushions on the plastic jackets of hoses, tubes or the like. The extruder consists of a fixed part and of at least one movable part which can be adjusted between two end positions and combines the following features:

(a) the movable part (8b) is rotatable with respect to the fixed part (8a);
(b) the fixed and the movable part are provided with ray-shaped inwardly extending arms of which the inside ends extend as far as the hose or tube surface at the jacket material; and
(c) the arms of the movable part (8b) are of widths such that in one of the end positions of the movable part they bare the free spaces between the arms of the fixed part and in the other position they cover them.

4 Claims, 5 Drawing Figures

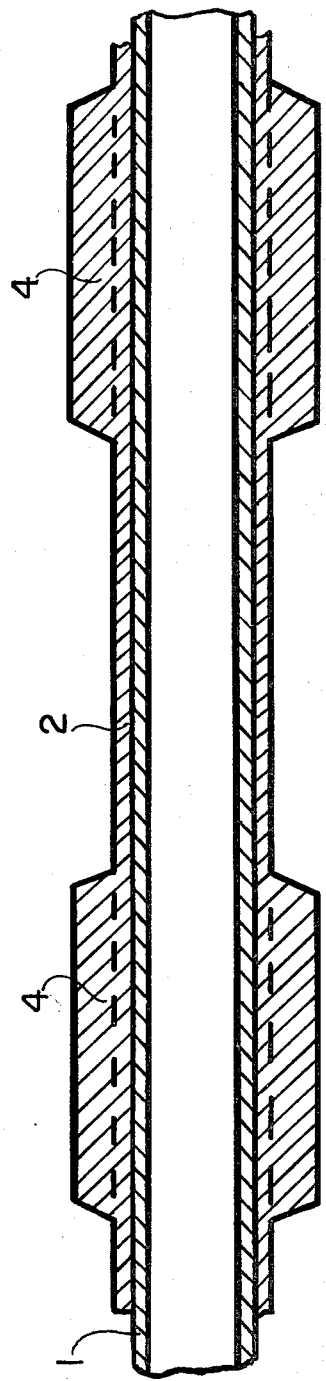
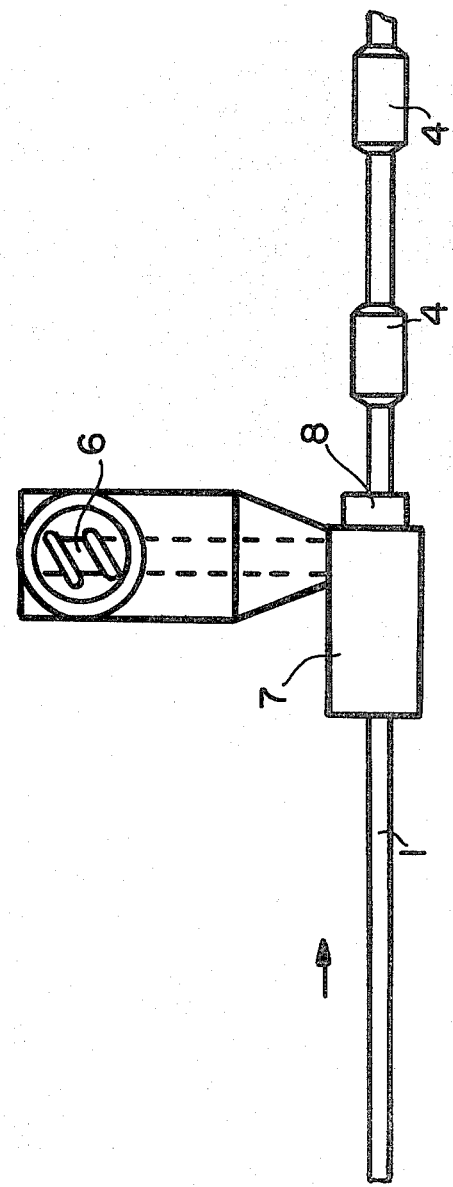

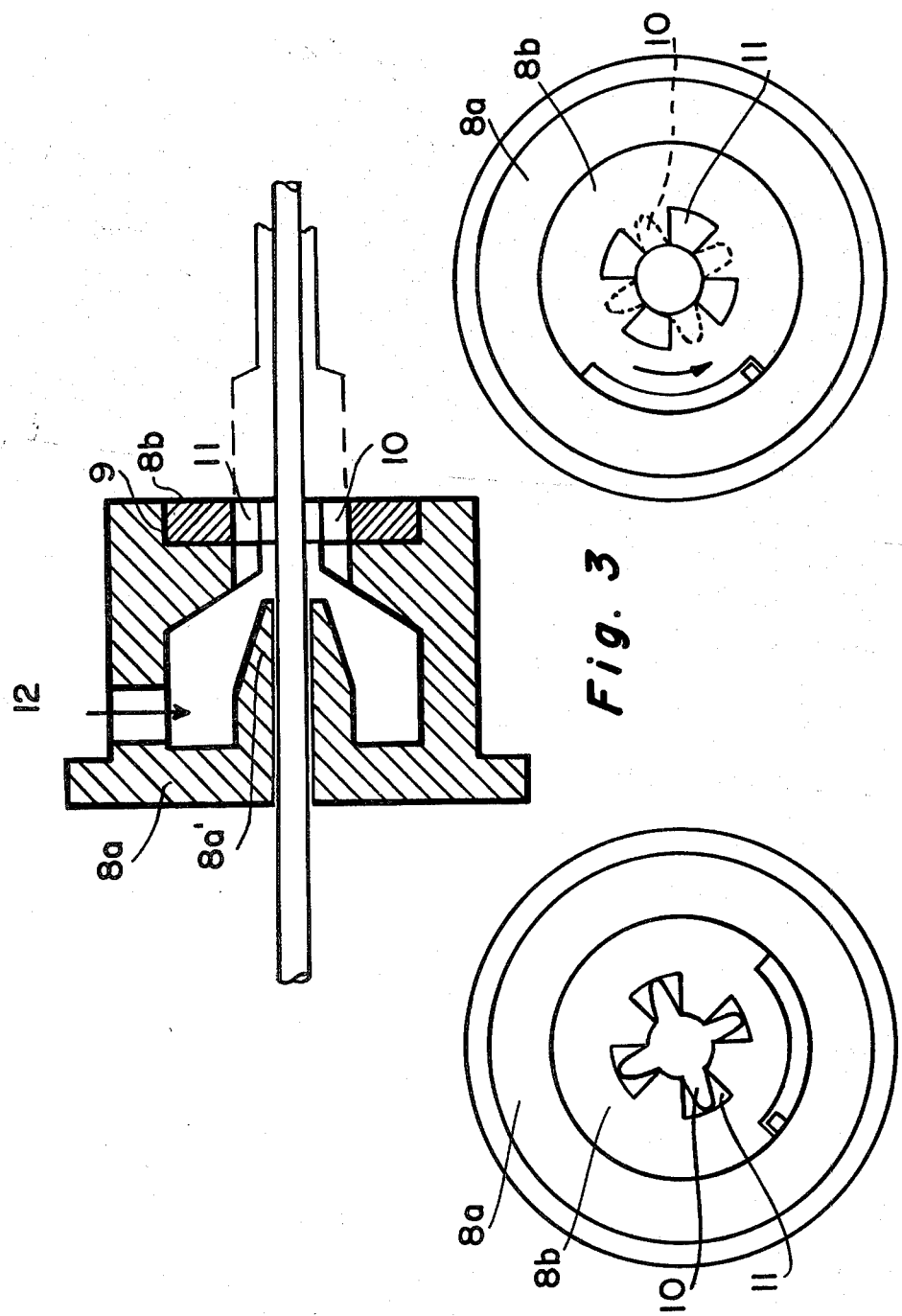

EXTRUDER COATING DIE

The invention concerns a coating die for extruders to sheathe hoses, tubes or the like with a plastic layer of variable shaped and/or thickness during the extrusion process, and workpieces made using this die.

It is known to sheathe hoses, tubes or the like with a plastic jacket using extruder machines. The hose or the tube passes in endless manner, or at least in great lengths, through the extruder head of the machine wherein it is enclosed by the heated plastic which is gauged by the coating die to the corresponding thickness and/or shape. In this manner for instance the spiral hoses of bowden cables are provided with a plastic jacket. A great many other types of hoses and tubes are lined in this manner.

The hose so made then are assembled, integrated, and laid in arbitrary manner in a support means.

To prevent that the hoses should rattle in their support means, whereby an unpleasant noise is generated, and whereby the plastic jacket might be abraded, it is known to draw over the jacket another additional, ordinarily much thicker protective jacket which however is of a length approximately only the length of the support means. The protective hose then supports the hose proper within the support means, and thus any rattling and any damage to the hose is prevented.

However this protective hose represents a more than trivial cost when manufacturing such hoses and tubes. The costs are most of all incurred in that the protective hose must be pulled over the hose and that it must be positioned at the right hose location, and lastly that it must be firmly bonded, or fused ultrasonically, or fixed in some other manner. All these are operational steps requiring manual execution and accordingly are relatively cost-intensive.

Accordingly the U.S. Pat. No. 3,557,403 discloses periodically enlarging and reducing the aperture of the extruder die while the hose, tube or the like is transiting. In this manner periodic thickenings are created on the hose, which are integral with the hose sheath. However the thickenings obtained in this manner consist of a solid material and are poorly suited to act as protective cushions because they do not absorb impacts at all.

It is therefore the object of the invention to provide an extruder coating die permitting to make protective cushions much more suited for this purpose and capable of better absorbing impacts.

This problem is solved by the invention by a coating die evincing the features. This die consists of a fixed and at least one movable part. The movable part is rotatable between two end positions and in one of its end positions covers a portion of the die aperture in the fixed part. Both the fixed and the movable parts are provided with ray-like, inwardly extending arms of which the inside ends reach as far as the jacket on the hose or tube surface. The movable part arms are of such a width that they bare the free spaces between the fixed part arm when in one of the end positions and cover them in the other end position.

The movable part can be displaced manually, for instance by means of a lever linkage, but also by motor means, and it can be automatically controlled by means of a control gear.

A hose or tube provided with a plastic jacket using the coating die of the invention and provided with protective cushions arranged on the jacket is characterized in that the protective cushions are integral with the jacket and evince a ray-shaped cross-section.

The invention is shown in the drawing in relation to an illustrative embodiment.

FIG. 1 is a jacketed tube with protective cushions,

FIG. 2 is a schematic topview of an extruder with extruder head and extruder die, FIG. 3 is a schematic section of an extruder die with fixed and movable parts, FIG. 4 is an elevation of the extruder die in the direction of arrow A of FIG. 3 in the position of the small cross-sectional aperture, FIG. 5 is an elevation of the extruder die of FIG. 4 with an enlarged cross-section.

FIG. 1 shows a tube 1 sheathed by a plastic layer 2. The plastic layer evinces two thickenings obtained by transiently enlarging the extruder die cross-section during the transit of the tube 1 through the extruder. The thickenings act as protective cushions 4 when integrating or assembling the tube. When assembled, the tube rests by this protective cushion in its support means.

FIG. 2 shows a topview of an extruder 5 by means of which the tube 1 is sheathed with the plastic layer 2. The extruder is provided at the top with a funnel receiving the plastic granulate which is moved by a screw 6 to the extruder head 7. The tube 1 is moved from the left in the direction of the arrow toward the extruder head 7 and there it moves through an extruder die (8) which determines the diameter of the plastic sheath.

FIG. 3 is a detailed view of the extruder die. The die consists of a fixed part 8a containing a centering guide means 8a' for the tube 1 and of a movable part 8b which is rotatable by about 90° between two end positions in a recess 9 of the fixed part.

Both the fixed part 8a and the movable part 8b evince central star-shaped apertures 10 and 11 as indicated in FIGS. 4 and 5. The star-shaped aperture 10 is located in the fixed part 8a, while the aperture 11 is in the movable part 8b. The heated plastic is forced through a hole 12 into the die.

Ordinarily the flanks of the aperture 11 cover the aperture 10 during the coating process. This position is shown in FIG. 4. The sheathing of the tube therefore takes place with a plastic layer of relatively small diameter. If however a predetermined tubular segment passes through the die that later will be used in a holding means or the like to support the tube, then the movable die part 8b shall be rotated in the direction of the arrow of FIG. 4 and thus arrives at the position shown in FIG. 5. In that position the flanks bounding the aperture 11 will clear the star-shaped extensions of the aperture 10. Accordingly for this position of the movable part, the tube 1 will be provided with a plastic sheath of a larger diameter and a star-shaped cross-section.

Later, when the tube is being assembled, these star-shaped extensions will act as protection cushions.

It must be pointed out however that the number of star-shaped extensions, namely four, was selected merely illustratively. Any other appropriate number of extensions may also be chosen.

We claim:

1. An extruder coating die for depositing protective cushions on the plastic jackets of hoses, tubes or the like comprising:

(a) means for delivering said hoses, tubes or the like along an axis;

(b) means for delivering plastic materials in a path along said axis;

(c) a fixed die part located along said axis in said path of plastic material;
(d) a movable die part located along said axis in said path after said fixed die part having means for rotation about said axis from a first position to a second position;
(e) said fixed die part and said movable die part having ray-shaped inwardly extending arms with inside ends extending to said plastic jackets; and
(f) said arms of said movable die part having widths sufficient to bare free spaces between said arms of said fixed die part in said first position and cover said free spaces between said arms of said fixed die part in said second position.

2. The extruder coating die of claim 1, wherein said movable part is manually adjusted.

3. The extruder coating die of claim 1, wherein said movable part is adjustable by means of a control gear.

4. The extruder coating die of claim 1, having a single means for delivering plastic materials.

* * * * *